(12) United States Patent
Bromba et al.

(10) Patent No.: US 6,836,556 B1
(45) Date of Patent: Dec. 28, 2004

(54) DEVICE AND METHOD FOR IDENTIFYING A PERSON BY BIOMETRIC CHARACTERISTICS

(75) Inventors: Manfred Bromba, Munich (DE); Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/807,690

(22) PCT Filed: Aug. 17, 1999

(86) PCT No.: PCT/DE99/02572

§ 371 (c)(1),
(2), (4) Date: Apr. 16, 2001

(87) PCT Pub. No.: WO00/22581

PCT Pub. Date: Apr. 20, 2000

(30) Foreign Application Priority Data

Oct. 14, 1998 (DE) .......................... 198 47 415

(51) Int. Cl.⁷ .......................... G06K 9/00; G05B 19/00
(52) U.S. Cl. .................. 382/124; 382/218; 340/5.83
(58) Field of Search ................ 382/115–119, 124–126, 382/209, 218, 291; 340/5.81, 5.82, 5.83; 380/247; 455/411; 713/202

(56) References Cited

U.S. PATENT DOCUMENTS

| | | | | |
|---|---|---|---|---|
| 5,241,606 A | * | 8/1993 | Horie | 382/126 |
| 5,701,770 A | * | 12/1997 | Cook et al. | 70/63 |
| 5,719,950 A | * | 2/1998 | Osten et al. | 382/115 |
| 5,917,928 A | * | 6/1999 | Shpuntov et al. | 382/124 |
| 5,933,515 A | * | 8/1999 | Pu et al. | 382/124 |
| 6,219,793 B1 | * | 4/2001 | Li et al. | 713/202 |

FOREIGN PATENT DOCUMENTS

| | | |
|---|---|---|
| EP | 0 329 166 | 8/1989 |
| WO | WO 98/10370 | 3/1998 |
| WO | WO 98/11750 | 3/1998 |

* cited by examiner

*Primary Examiner*—Daniel Miriam
(74) *Attorney, Agent, or Firm*—Bell Boyd & Lloyd LLC

(57) ABSTRACT

An apparatus and method for the biometric identification of a person, who has an authentication area containing biometric features, the apparatus including a sensor having an identification area for detecting the biometric features of the part of the person's authentication area which is situated on the identification area, a comparison device for comparing the detected biometric features with the biometric features, stored in a memory, of a part of the authentication area of an authorized person or of a number of authorized persons in order to determine the relative position of the biometric features detected by the sensor within the part of the authentication area, and a computation device for calculating an identification code, which identifies the person detected by the sensor, from the detected biometric features which are not stored in the memory on the basis of the relative position of the biometric features which are stored in the memory within the stored authentication area.

6 Claims, 1 Drawing Sheet

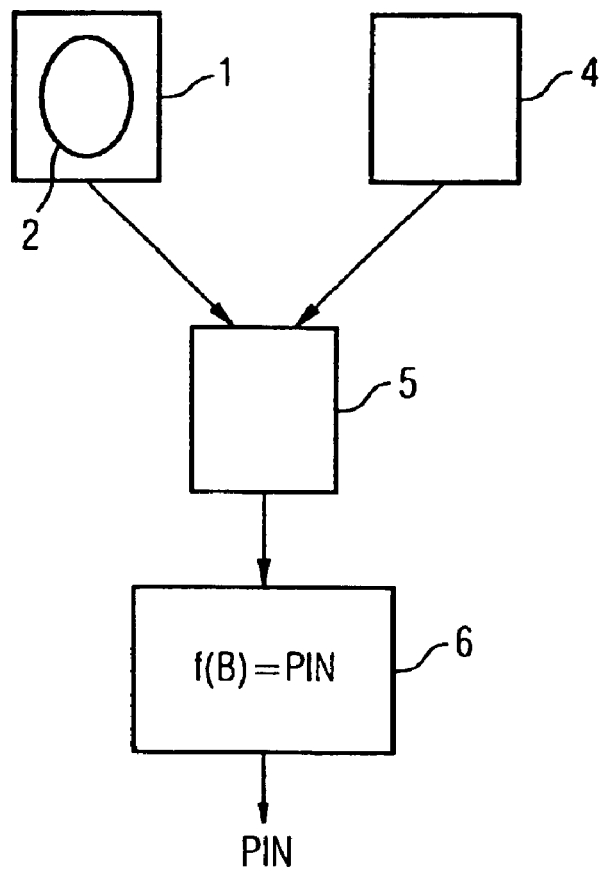
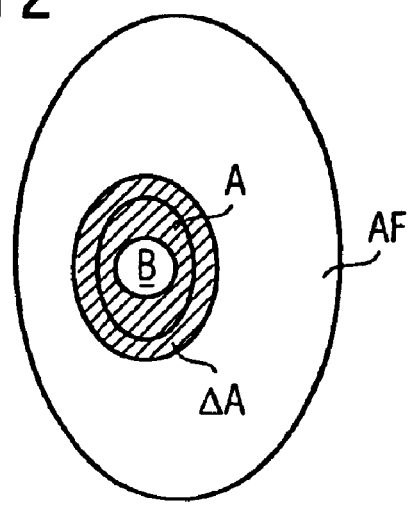

DEVICE AND METHOD FOR IDENTIFYING A PERSON BY BIOMETRIC CHARACTERISTICS

The present invention relates to an apparatus and to a method for the biometric identification of a person, who has an authentication area containing biometric features. Such apparatuses and methods are used, for example, in electronic appliances where a user needs to authenticate himself before using the appliance. Examples of such electronic appliances are telecommunication appliances, such as mobile telephones, and computers. In mobile telephones, for example, it is usual to use a so-called personal identification number (PIN) as access authorization. In this context, in order to be able to make a telephone call, the user needs to enter a particular PIN which is known only to him. The mobile telephone checks this PIN and, if the check is positive, enables the mobile telephone for the purpose of making calls.

In addition, more general identification codes, like PINs, are used in computers in order to control access to particular data or services of the computer or of a communication network to which the computer is connected.

Usually, the authentication information is entered using a keypad associated with the apparatus and is then checked. In this way, the authorization of the user making the entry is established by the mobile telephone, the computer or the communication network.

In mobile telephones based on the GSM standard, this is done by virtue of a data processing device on the appliance's 'SIM' card checking whether the entered PIN matches the information stored on the SIM card. If this is the case, the SIM card enables the telephone for use. According to the GSM standard, a particularly high level of security is obtained for the telephone customer by virtue of the fact that the PIN must not be stored in the mobile telephone itself, but rather is stored on the SIM card in encrypted form only.

In addition, biometric identification methods have recently been developed in which biological or biometric features of a user are used for authentication purposes. By way of example, the fingerprint of a user is used as unique identification of this user. Such biometric identification is a complex but convenient and often very secure method of ensuring that a particular person is associated with and can access a service, an object or a place. In this context, the advantage of biometric identification over the PIN is that it cannot be forgotten, and that the biometric features can be copied only with very great difficulty, or cannot be copied at all. Whereas the PIN is pure software, biometric features always have a more or less unique association with the hardware, i.e. with the body of the authorized user. Since the PIN entails the entry of digits or text, which usually requires a series of keystrokes, this always results in convenience being diminished, and hence sometimes in the security measures being bypassed. For example, with some mobile radio services, the user is able to turn off the PIN completely, at his own risk. Mobile radio services do not require acknowledgement of each individual telephone call by means of the PIN. This means that, once it has been turned on, a mobile telephone can be used by any third parties and hence also by unauthorized persons at the cost of the owner of the mobile telephone. Modern mobile telephones are increasingly trying to restrict the entry of digits for telephone numbers to emergencies. Attempts are even being made to manage with mobile telephones with no keypad at all for some applications. In this case, distinctive biometric identification, if it is possible with little effort, is very advantageous.

In current mobile telephones, however, the problem arises that they require the PIN to be stored on the SIM card in order to conform to standard on the basis of the GSM standard, as explained above. In accordance with the GSM standard, this PIN must not be additionally stored in the mobile telephone itself. The problem which this poses is that the PIN cannot be completely replaced by biometric identification without changing the GSM standard.

For this reason, a method has been proposed in which a unique identification number can be derived from biometric features. This unique identification number can accordingly be used as a PIN and, by way of example, can be forwarded to the SIM card of a mobile telephone. It is evident that, in this case, the PIN is not stored in the mobile telephone itself, but rather is merely calculated by the latter from detected biometric features.

If an authentication area of a person, such as the fingerprint of the person, is used, this authentication area contains biometric features which uniquely identify the person. In this context, the total authentication area, i.e. the fingerprint area, which can be used to identify the user is usually larger than the identification area of a sensor detecting the biometric features of the person's authentication area. This means that the sensor uses only part of the person's authentication area to derive the unique identification number. Accordingly, variations in position, for example of the fingerprint area, on the identification area of the sensor can result in different identification numbers. Such different identification numbers for a user cannot be used as a PIN and make unique identification of the user more difficult.

It is the object of the present invention to provide an apparatus and a method for the biometric identification of a person, who has an authentication area containing biometric features, in which a unique identification number can be derived irrespective of variations in the positioning of the part of the person's authentication area which is situated on the identification area of the sensor.

The invention provides an apparatus for the biometric identification of a person, who has an authentication area containing biometric features, comprising a sensor having an identification area for detecting the biometric features of the part of the person's authentication area which is situated on the identification area, a comparison device for comparing the detected biometric features of the first area with the biometric features, stored in a memory, of a part of the authentication area of an authorized person or of a plurality of authorized persons and for determining the relative position of the biometric features detected by the sensor within the part of the authentication area, and a computation device for calculating an identification code, which identifies the person detected by the sensor, from the detected biometric features which are not stored in the memory 4 on the basis of the relative position of the biometric features which are stored in the memory (4) within the stored authentication area.

An advantage of the apparatus according to the invention is that the identification area of the sensor is split into two regions, with one region being used for position determination within the authentication area while the second region is used to generate a unique identification number, the biometric features of this region not being stored in the apparatus. This ensures that, even if different portions of the user's authentication area are in contact with the identification area of the sensor, it is always possible to calculate a unique identification code which characterizes the user.

In one embodiment of the invention, the sensor detects the fingerprint of a person, the person's authentication area comprising the possible fingerprint areas of a finger of this person which are not used to calculate the identification code.

The advantage of the use of a fingerprint sensor is that the user can firstly place a finger on the sensor without any particular trouble, and, secondly, the biometric features of the fingerprint area permit particularly reliable identification of the user.

In addition, the present invention provides an appropriate method for the biometric identification of a person by means of an authentication area containing biometric features.

The fact that, in one embodiment of the method, the identification area is subdivided such that the region used for the position determination within the authentication area completely surrounds the area used to calculate the identification code ensures that the second, enclosed region always contains sufficient biometric features to calculate a unique identification code.

Illustrative embodiments of the present invention are now explained with the aid of the drawings.

FIG. 1 shows an illustrative embodiment of the present invention, and

FIG. 2 shows one possible position of that region of a person's authentication area which is detected by the identification area of the sensor.

In the illustrative embodiment explained here, the present invention is explained using an apparatus and a method which uses a person's fingerprint to identify this person. Hence, the person's authentication area is part of the total fingerprint area of a finger of this person. In addition, the biometric features of the fingerprint area are the line ends and bifurcations of the corresponding fingerprint.

FIG. 1 shows, schematically, an illustrative embodiment of the apparatus according to the invention. The sensor 1 is used to detect part of the total fingerprint area of a finger of the person who is to be identified. To this end, the sensor 1 has an identification area 2 onto which the user places the finger. Since the identification area 2 is smaller than the total fingerprint area of a finger, the identification area 2 is used to detect a particular portion of the fingerprint. The identification area 2 is used to detect the biometric features of the part of the total fingerprint area which is in contact. The information detected by the sensor 1 is supplied to a comparison device 5.

When the apparatus is initialized, i.e. before a person is first identified, the part of the total authentication area of the authorized person(s) which is required to determine the position of the detected biometric features is stored in a memory 4. By way of example, a region of the area A−B+ΔA may be stored, where ΔA forms a ring having a particular tolerance width around A. In the illustrative embodiment described in this case, this means that the fingerprint area of a finger of the authorized person(s) which is used to determine the identification code is not stored in the memory 4.

The comparison device 5, which is connected both to the sensor 1 and to the memory 4, compares the detected biometric features with the biometric features stored in the memory 4. A match between the biometric features of a region A, for example, and a geometric region within the authentication area stored in the memory 4 gives the relative position of the detected region A within the authentication area. This comparison gives the information about which part of the fingerprint has been placed onto the identification area 2 of the sensor 1. Hence, the outer region A is used for centering, while the central region B surrounded by the region A is used later to generate the identification code or the PIN. The regions A, B are thus advantageously chosen such that the outer region A forms a ring, containing biometric features, which completely surrounds the central region B. However, in another embodiment of the invention, the biometric features may also be split into two regions differently. By way of example, the right-hand and left-hand halves or the top and bottom halves could be chosen as the subdivision. In addition, the branches and the line ends of the fingerprint could be used as the subdivision.

For the purposes of centering, it is not absolutely necessary for the outer region A to be complete, i.e. to contain biometric features throughout. If there are variations in the contact of the finger on the identification area 2, it is possible that no biometric features are detected at the extreme edge of the outer region A. If, however, biometric features are detected in a closed ring, surrounding the central region B, of the outer region A and have their position determined by means of comparison with the authentication area stored in the memory 4, then at least the central region B is available in its entirety and in the correct position. In addition, in a learning phase when the apparatus is initialized, it is possible for an algorithm to decide what belongs to the central region B and what belongs to the outer region A.

The comparison device 5 supplies the result of the position determination for the part of the total fingerprint area which is detected by the sensor 1 to a computation device 6. The computation device 6 calculates from the biometric features of the central region B, whose relative position is determined from the position of the region A, an identification code which uniquely identifies the person detected by the sensor 1. This identification code may be a PIN, for example, which is supplied to the SIM card of the mobile telephone.

Hence, neither the PIN nor the biometric features from which the PIN is calculated is/are stored in the inventive apparatus itself. The only thing stored in the memory 4 of the apparatus is part of the authentication area containing biometric features. The sensor 1 is used to detect biometric features of a person, and the computation device 6 is used to convert them into a PIN which can then be output. In addition, the person's PIN or identification code can be derived even if, for different identification operations, a different part of the authentication area of the person has been placed on the identification area 2 of the sensor 1 in each case.

FIG. 2 is intended to be used to illustrate the ratio of the person's total authentication area to the part of the authentication area which is stored in the memory 4 and to the part of this authentication area which is detected by means of the identification area of the sensor 1. For the purposes of illustration, the identification of a person by means of the biometric features of a fingerprint is again used as an example. In this case, the authentication area AF is the fingerprint of a finger of the person. The total range of this authentication area contains biometric features which uniquely identify a person. Of these, the part which is shown shaded is stored in the memory 4. This part is given by the area of the region A less the area of the region B plus a tolerance region ΔA for the region A.

When the person places his finger to be used for identification onto the identification area 2 of the sensor 1, the sensor 1 detects a particular part of the total fingerprint area AF. This is illustrated in FIG. 2 by means of the ellipse surrounding the area A within the region AF. Depending on the position of the finger on the identification area 2 of the sensor 1, this ellipse moves within the region AF stored in the memory 4.

The part of the authentication area which is detected by means of the sensor 1 is subdivided into two regions A and B. The biometric features of the region A can now be compared with biometric features of the area AF stored in the memory 4 which have a geometrically identical arrangement. If a match has been determined, the position of the region A within the authentication area AF is obtained unambiguously, and hence so too is the position of the second region B, since the latter region is in a particular, in this case geometrical, relationship with respect to the region A. This information and the biometric features of the second region B can then be used to calculate the identification code or the PIN.

What is claimed is:

1. An apparatus for biometric identification of a person, who has an authentication area containing biometric features, comprising:

a sensor having an identification area for detecting biometric features of a part of the authentication area which is situated on the identification area;

a comparison device for comparing the detected biometric features with biometric features, stored in a memory, of a part of the authentication area of at least one authorized person to determine a relative position of the detected biometric features of a first detected region within the part of the authentication area; and a computation device for calculating an identification code, which identifies the person detected by the sensor, from the detected biometric features which are not stored in the memory based on the relative position of the biometric features which are stored in the memory within the stored authentication area.

2. An apparatus for biometric identification of a person as claimed in claim 1, wherein the sensor detects a fingerprint, and the authentication area includes those parts of the possible fingerprint area of a finger which are not used to calculate the identification code.

3. A method for biometric identification of a person, who has an authentication area containing biometric features, the method comprising the steps of:

storing biometric features of a part of the authentication area of at least one authorized person;

detecting biometric features of the part of the person's authentication area which is situated on the identification area;

comparing the detected biometric features with the stored biometric features of the authentication area to determine a relative position of the detected biometric features within the stored part of the authentication area; and calculating an identification code which identifies the person detected by the sensor from the detected biometric features which are not stored in the memory based on the relative position of the biometric features which are stored in the memory within the stored authentication area.

4. A method for biometric identification of a person as claimed in claim 3, wherein biometric features of a person's fingerprint are detected, and the authentication area includes those parts of the possible fingerprint areas of a finger of the person which are not used to calculate the identification code.

5. A method for biometric identification of a person as claimed in claim 3, wherein a first region containing biometric features which are stored in the memory completely surrounds a second region containing biometric features which are not stored in the memory.

6. A method for biometric identification of a person as claim in claim 5, wherein an identification code is calculated only if the detected first region forms a closed ring, surrounding the second region, containing biometric features.

* * * * *